United States Patent
Berni et al.

[15] 3,644,082
[45] Feb. 22, 1972

[54] PREPARATION OF DIETHYLAMINOETHYL COTTON USING NONAQUEOUS SOLVENTS

[72] Inventors: Ralph J. Berni, Metairie; Ruth R. Benerito; John B. McKelvey; Truman L. Ward; Donald M. Soignet, all of New Orleans, all of La.

[73] Assignee: The United States of America as represented by the Secretary of Agriculture

[22] Filed: June 24, 1970

[21] Appl. No.: 49,412

[52] U.S. Cl.................................8/116.2, 8/120, 8/116.3, 260/231 A
[51] Int. Cl....................................D06m 13/08, D06m 13/38
[58] Field of Search...........................................8/116.2, 120

[56] References Cited

UNITED STATES PATENTS 1,777,970  10/1930  Hartmann................................8/116.2
3,574,522  4/1971  Rowland et al.........................8/116.2
3,579,289  5/1971  Soignet et al..........................8/116.2

*Primary Examiner*—George F. Lesmes
*Assistant Examiner*—J. Cannon
*Attorney*—R. Hoffman and W. Bier

[57] ABSTRACT

Fibrous cellulosic material was impregnated with a swelling agent, solvent exchanged to remove any water present, and reacted with a solution containing sodium methoxide. This product was rinsed, then reacted with a solution containing 2-chloroethyldiethylamine and washed. The finished product was a partial cellulose ether having anion exchange properties with a wide range of ion exchange capacities. By converting the finished product to the acid salt form in situ catalytic sites for cross-linking reactions are provided. In addition, the diethylaminoethylated product may be converted to the quaternary form by refluxing with methyl iodide.

7 Claims, 1 Drawing Figure

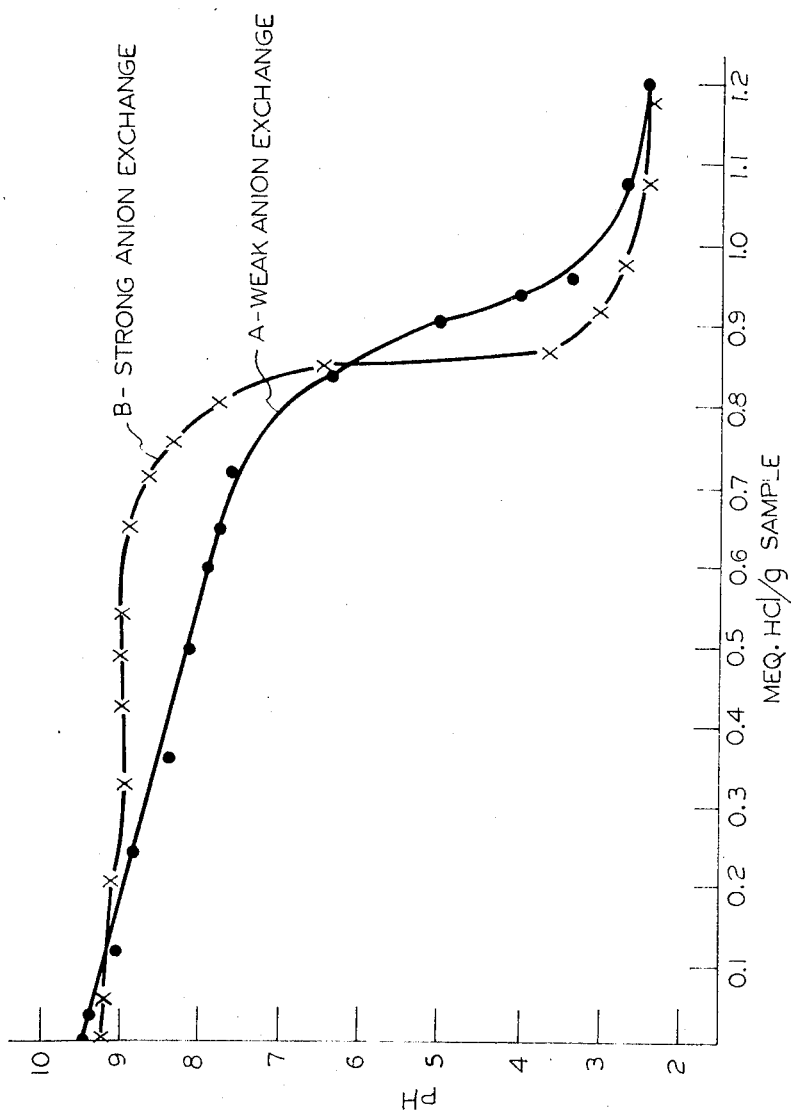

PREPARATION OF DIETHYLAMINOETHYL COTTON USING NONAQUEOUS SOLVENTS

A nonexclusive, irrevocable, royalty-free license in the invention herein described throughout the world for all purposes of the United States Government, with the power to grant sublicenses for such purposes, is hereby granted to the Government of the United States of America.

This invention relates to the production of partial cellulose ethers with anion exchange properties. More particularly, this invention relates to the reaction of cellulose, pretreated with sodium methoxide in methanol solution, with 2-chloroethyidiethylamine (CED) in nonaqueous solvents to produce a partial cellulose ether with anion exchange properties which can be in a selected range of weak to strong. Furthermore, these cellulose ethers can also be used as in situ catalyzed textiles to obtain permanently pressed cotton materials.

A primary object of the present invention is to provide a method for preparing some cellulose ethers with anion exchange properties.

Another object of this invention is to provide a method for preparing cellulose ethers in fabric form which can be used as in situ catalysts for permanent press resins.

A further object of this invention is to provide a method for quaternizing DEAE fabric to form a strong anion exchange cotton without requiring special drying methods to remove final traces of water.

Prior art processes are known for the preparation of anion exchangers. Cellulose, particularly DEAE-cotton, was pretreated with aqueous NaOH solution and reacted in aqueous solutions of the amine hydrochloride. Prior processes produced fabrics with only 0.4 percent N for a single treatment of fabric regardless of reaction conditions employed. Subsequent treatments were necessary to produce fabrics of 0.8 to 1.2 percent N, levels necessary for good anion exchange properties and in situ catalytic activity.

In contrast to prior art process for the formation Of cellulose ethers with anion exchange properties, this invention produces a product with as high as 1.46 percent N in a single treatment.

The following equations illustrate pertinent reactions:

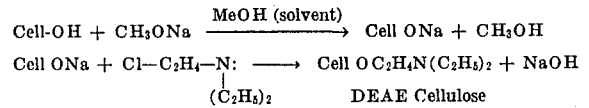

Prior art processes are known for the preparation of a strong base anion exchangers to partially convert diethylaminoethylated cotton to the quaternary form by refluxing in 10% $CH_3I$ in absolute alcohol. Benerito, R. R., Woodward, B. B., and Guthrie, J. D., [Anal. Chem. 37, 1,693 (1965)] found that a large number of tertiary amine groups could be converted to quaternary groups; however, it was necessary to treat the fiber under completely anhydrous conditions obtained only after many hours of drying over $P_2O_5$. This is commercially impractical, of course.

The present process is already a nonaqueous process, so that the $CH_3I$ reflux can be accomplished immediately after the removal of the unreacted amine with several washings of tertiary butanol. Good conversion to the quarternary is thus obtained without having to use extra drying procedures or having to wash, dry, and condition the DEAE fabric before quaternization.

The present invention includes pretreatment of cotton fabrics by successive solvent exchanging with dimethylformamide, then absolute methanol followed by reaction with 0.1 to 1.65 molar $NaOCH_3$ in methanol for 10 to 90 minutes. The sodium cellulosate (sodacell) thus formed is quenched free of excess sodium methoxide with three successive passes of tertiary butanol. The sodacell fabric can then be reacted in solutions containing 5 to 10 percent chloroethyldiethylamine in tertiary butanol for various times at temperatures from 20° to 35° C. The treated fabric is then neutralized in 5 percent aqueous acetic acid solution and washed in hot tapwater (60° C., pH 10) for 30 minutes, rinsed in distilled water, and ironed dry. Swelling agents other than dimethylformamid solutions with which fibrous cellulosic materials may be pretreated in the present process include solutions of dimethyl-sulfoxide, sodium hydroxide, zinc chloride, zinc bromide and tetrabutylammonium hydroxide.

To determine the ion exchange, an accurately weighed sample of sufficient weight to give approximately 0.8 m.eq. of replaceable anion was placed in a titration flask containing exactly 50.00 ml. of a salt solution prepared with conductivity water and kept in a nitrogen atmosphere. The sample was allowed to equilibrate overnight in the titration flask while being stirred with nitrogen gas bubbled first into a bubbler containing the given solution before being bubbled into the titration flask to minimize concentration changes in the flask. All potentiometric titrations were carried out in specially designed cells of approximately 250 ml. capacity having four ground glass outlets to accommodate the microburet in the center, and inlet-outlet tube for nitrogen, the glass electrode, and the saturated calomel electrode. All pH measurements were made with a Beckman Model G–S pH meter to ±0.05 pH unit. Each titration required from 8–12 hours because of the time required in some instances for establishment of equilibrium. The accompanying FIGURE illustrates the curves of strong (A) and weak (B) ion exchange cotton.

For use of the treated fabric as an in situ catalyst, the fabric can be converted to the hydrochloride form by treating with dilute hydrochloric acid and rinsing in distilled water. The acidified fabric can then be used in a standard pad dry cure process with any of a number of N-methylolurea derivatives, such as dimethylolethyleneurea or dimethylolpropyleneurea and the like (see patent application Ser. No. 3,514, filed Jan. 16, 1970) now U.S. Pat. No. 3,579,289.

EXAMPLE 1

A 10-gram sample of desized, scoured, and bleached cotton printcloth (80 × 80 thread count) was rolled and immersed in a glass container and solvent exchanged 3 times with absolute methanol to remove all trace of water. This sample was then reacted with 1.0 M $NaOCH_3$ methanol solution for 1 hour, at room temperature, to allow for complete penetration. The fabric sample was passed through squeeze rolls to remove as much of the solution as possible and several passes of tertiary butanol were used to extract whatever unreacted $NaOCH_3$ was left on the fabric. This fabric sample was then placed in a vessel containing a 10 percent by volume (0.68 molar) solution of 2-chloroethyldiethylamine (CED), a 200 ml. tertiary butanol solution total volume. This reaction consists of agitating the contents at room temperature for a total of 11 hours. Having thus reacted the sample it was then removed from the solution, neutralized in 5 percent acetic acid solution, washed in hot tapwater for 30 minutes, rinsed in distilled water, and ironed dry and allowed to equilibrate overnight. The partially etherified fabric had a nitrogen content of 1.34 percent, and showed good anion exchange properties, equivalent to commercial DEAE-cotton (see FIG. 1).

EXAMPLE 2

A 10-gram sample of cotton fabric, as in Example 1, was rolled and immersed in a solution of sodium hydroxide of mercerizing strength (22.9 percent). The sample was retrieved after contact with this solution for 30 minutes at room temperature, and passed through squeeze rolls to remove as much of the caustic solution as possible, then the sample was neutralized with 5 percent acetic acid and rinsed thoroughly with distilled water. The wet sample was solvent exchanged five times with absolute methanol to remove all trace of water; reacted as in Example 1 with sodium methoxide; the excess solvent exchanged with t-butanol, then reacted with CED but this time for 24 hours. The partially etherified cotton fabric had a nitrogen content of 1.72 percent, and the ion exchange properties were equivalent to those of Example 1.

EXAMPLE 3

A series of 12 samples of cotton printcloth were submitted to the treatments of Example 1 but varying the sodium ion content, the reaction temperature and the reaction time. The results of this series are tabulated here. Ion exchange properties were equivalent to those of Example 1.

| Reaction Time (Hr.) | Reaction Temp. (°C.) | Nitrogen (%) | Breaking Str. Ret. (%) | Elongation (%) |
|---|---|---|---|---|
| 1[a] | 25 | 0.36 | 84 | 10.8 |
| 18 | 25 | 1.00 | 70 | 17.3 |
| 1 | 35 | 0.49 | 72 | 12.7 |
| 18 | 35 | 1.23 | 78 | 17.1 |
| 1 | 45 | 0.72 | 99 | 14.4 |
| 18 | 45 | 1.31 | 94 | 20.0 |
| 1[b] | 25 | 0.33 | 89 | 10.4 |
| 18 | 25 | 1.13 | 70 | 17.6 |
| 1 | 35 | 0.38 | 82 | 14.8 |
| 18 | 35 | 1.20 | 77 | 21.3 |
| 1 | 45 | 0.70 | 92 | 12.4 |
| 18 | 45 | 1.46 | 71 | 22.2 |
| Untreated cotton | | | (50 lb.) | 7.4 | a/ Sodacell fabrics contained 0.7 m.eg. Na$^+$/gram.

b/ Sodacell fabrics contained 1.1 m.eg. Na$^+$/gram.

EXAMPLE 4

A series of seven samples of cotton printcloth were submitted to the treatments of Example 2, at room temperature, but varying the reaction time. The results of this series are tabulated here. Ion exchange properties were equivalent to those of Example 2.

| Reaction Time (hr.) | Nitrogen (%) | Breaking Str. Ret. (%) | Elongation (%) | Stoll Flex Abrasion (cycles) |
|---|---|---|---|---|
| 1 | 0.34 | 57.4 | 31.3 | 467 |
| 2 | 0.60 | 60.3 | 27.6 | 364 |
| 4 | 1.04 | 58.1 | 28.7 | 320 |
| 5 | 1.15 | 54.9 | 35.3 | 328 |
| 7 | 1.21 | 52.2 | 32.0 | 375 |
| 17 | 1.40 | 53.0 | 31.0 | 518 |
| 24 | 1.72 | 51.4 | 34.0 | 395 |
| Untreated control | | 53.0 | 7.4 | 487 |
| Premercerized control | | 60.5 | 33.7 | 768 |

EXAMPLE 5

A cotton printcloth (80 × 80) fabric sample was treated by the process of Example 2, and after the third washing with tertiary butanol the solvent was removed from the reaction chamber and a 10 percent freshly distilled methyl iodide (CH$_3$I) in absolute ethanol was added. The solution with the fabric sample in it was refluxed for 5 hours (temperature about 80° C.), then the fabric sample was washed with ethanol and ironed dry. The finished sample had a nitrogen content of 1.69 percent, and an iodine content of 13.61 percent. This fabric sample showed strong anion exchange properties (see attached figure showing the results of titration with 0.1 N HCl).

EXAMPLE 6

A cotton printcloth (80 × 80) fabric sample was treated as in Example 1; however, a 2.5 percent CED (0.17 molar) tertiary butanol solution was employed in a 24-hour reaction time at 25° C. The partially etherified cotton fabric had a nitrogen content of 0.87 percent, and exhibited moderately strong ion exchange properties.

EXAMPLE 7

The fabric prepared in Example 3 (second entry) containing approximately 1 percent N was soaked three times in 0.01N HCl to convert the fabric to the acid form. The fabric was then rinsed free of excess acid with distilled water and dried. The fabric was divided into three pieces then padded with 10 percent aqueous solution of dimethylol ethylene urea (DMEU), dried at 60° C. for 7 minutes and cured at various temperatures for 3 minutes. Results of the treated fabrics are as follows:

| Cure Temperature °C. | Nitrogen Wt. % | Formaldehyde Wt. % | Wrinkle Recovery (W+F)[2] Wet | Dry |
|---|---|---|---|---|
| 140 | 1.7 | 3.3 | 250 | 270 |
| 160 | 1.8 | 2.7 | 266 | 297 |
| 170 | 1.7 | 2.9 | 270 | 290 |
| DEAE control | 1.0 | | 194 | 155 |

| Cure Temperature °C. | Breaking Str. (lbs.) | Elongation (%) | M.S.[1] |
|---|---|---|---|
| 140 | 27 | 13 | .095 |
| 160 | 21 | 13 | .105 |
| 170 | 22 | 16 | .095 |
| DEAE control | 35 | 17 | |

1/ M.S. = molar substitution based on nitrogen added to fabric by DMEU treatment with one DMEU unit per cross-link.

We claim:
1. A process for producing partial diethylaminoethyl ethers of fibrous cellulose comprising:
   a. wetting a fibrous cellulosic material with a solution containing a swelling agent selected from the group consisting of:
      dimethylformamide,
      dimethylsulfoxide,
      15–23 percent sodium hydroxide,
      zinc chloride,
      zinc bromide, and
      tetrabutylammonium hydroxide to obtain a maximum degree of swelling of the fibrous structure of the cellulosic material,
   b. solvent exchanging the wet, swollen fibrous cellulosic material with absolute methanol to remove all traces of water while the swollen configuration is retained by the fibrous cellulosic material,
   c. reacting the anhydrous, swollen fibrous cellulosic material with a methanolic solution containing about from 0.1 to 1.65 moles of sodium methoxide, at room temperature for about from 10 to 90 minutes,
   d. rinsing the swollen reacted product with tertiary butyl alcohol to remove excess sodium methoxide, and
   e. reacting the fibrous cellulosic material from (d) with a tertiary butyl alcohol solution containing about from 2.5 to 10 percent 2-chloroethyldiethylamine for about from 1 to 24 hours at temperatures about from 25° to 45° C.

2. The process of claim 1 wherein the swelling agent is dimethylformamide.

3. The process of claim 1 wherein the swelling agent is dimethylsulfoxide.

4. The process of claim 1 wherein the swelling agent is aqueous 15–23 percent sodium hydroxide.

5. The process of claim 1 wherein the swelling agent is zinc chloride.

6. The process of claim 1 wherein the swelling agent is zinc bromide.

7. The process of claim 1 wherein the swelling agent is tetrabutylammonium hydroxide.